United States Patent
Bank et al.

(10) Patent No.: US 11,010,373 B2
(45) Date of Patent: *May 18, 2021

(54) SYNCHRONIZING DATA-SETS

(71) Applicant: INTERNATIONAL BUSINESS MACHINES CORPORATION, Armonk, NY (US)

(72) Inventors: Judith H. Bank, Cary, NC (US); Liam Harpur, Skerries (IE); Ruthie D. Lyle, Durham, NC (US); Patrick J. O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/225,115

(22) Filed: Dec. 19, 2018

(65) Prior Publication Data
US 2019/0121805 A1    Apr. 25, 2019

Related U.S. Application Data

(63) Continuation of application No. 14/555,323, filed on Nov. 26, 2014, now Pat. No. 10,216,789, which is a continuation of application No. 14/183,496, filed on Feb. 18, 2014, now Pat. No. 10,120,896.

(51) Int. Cl.
*G06F 16/242* (2019.01)
*G06F 16/2453* (2019.01)

(52) U.S. Cl.
CPC ...... *G06F 16/2423* (2019.01); *G06F 16/2453* (2019.01)

(58) Field of Classification Search
CPC .......................... G06F 16/2423; G06F 16/2453
See application file for complete search history.

(56) References Cited

U.S. PATENT DOCUMENTS

| | | | |
|---|---|---|---|
| 7,509,672 B1 | 3/2009 | Horwitz et al. | |
| 7,860,815 B1 | 12/2010 | Tangirala | |
| 7,949,702 B2 * | 5/2011 | McGee | G06F 16/957 709/201 |
| 8,341,249 B2 | 12/2012 | Rakowski et al. | |
| 8,942,683 B2 | 1/2015 | Doerr | |
| 8,965,909 B2 | 2/2015 | Herron | |
| 9,087,323 B2 * | 7/2015 | Hein | G06Q 10/107 |
| 10,120,896 B2 | 11/2018 | Bank | |
| 10,216,789 B2 | 2/2019 | Bank | |

(Continued)

OTHER PUBLICATIONS

Apple, "Apple—iCloud—All your content on all your devices.", http://www.apple.com/icloud/features/, Jan. 23, 2014.

(Continued)

*Primary Examiner* — Cam Y T Truong
(74) *Attorney, Agent, or Firm* — L. Jeffrey Kelly

(57) ABSTRACT

Different data-sets for functionality to be synchronized across users can be identified by many variable including social networks the user is participating in, by identified interests of the user, by the physical location of the device being synchronized, by one or more applications being used on the device, by the season, by a social event being attended by a user, and by a wireless network being accessed at that time.

13 Claims, 5 Drawing Sheets

(56) References Cited

U.S. PATENT DOCUMENTS

| | | |
|---|---|---|
| 2003/0085923 A1* | 5/2003 | Chen .................. H04L 12/1813 715/751 |
| 2003/0167301 A1 | 9/2003 | Zhu |
| 2003/0167418 A1* | 9/2003 | Zhu .......................... H04L 1/22 714/4.12 |
| 2003/0177191 A1 | 9/2003 | Kawashima |
| 2005/0227216 A1 | 10/2005 | Gupta |
| 2005/0278544 A1 | 12/2005 | Baxter |
| 2006/0045030 A1 | 3/2006 | Bieselin |
| 2006/0059434 A1 | 3/2006 | Boss |
| 2006/0090154 A1 | 4/2006 | Bustelo et al. |
| 2007/0162942 A1 | 7/2007 | Hamynen et al. |
| 2008/0140498 A1 | 6/2008 | Setty |
| 2009/0282121 A1 | 11/2009 | Robertson |
| 2011/0022568 A1 | 1/2011 | Kim |
| 2011/0083079 A1 | 4/2011 | Farrell et al. |
| 2011/0167357 A1 | 7/2011 | Benjamin |
| 2011/0268263 A1 | 11/2011 | Jones |
| 2012/0042264 A1 | 2/2012 | Burckart et al. |
| 2012/0047147 A1 | 2/2012 | Redstone |
| 2012/0089710 A1* | 4/2012 | Rakowski ............ H04L 67/125 709/220 |
| 2012/0173500 A1 | 7/2012 | Chakrabarti et al. |
| 2013/0066832 A1 | 3/2013 | Sheehan et al. |
| 2013/0227015 A1 | 8/2013 | Mihara |
| 2013/0346347 A1 | 12/2013 | Patterson et al. |
| 2014/0051383 A1 | 2/2014 | Doerr |
| 2015/0201040 A1* | 7/2015 | Horling ............... H04L 67/1095 709/203 |

OTHER PUBLICATIONS

Larry Dignan, for Between the Lines "IBM Labs cooks up Web browsing history sharing tool", http://www.zdnet.com/blog/btl/ibm-labs-cooks-up-web-browsing-history-sharing-tool/30930, Feb. 18, 2010.

A. Gunawardana et al, "Usability Guided Key-Target Resizing for Soft Keyboards", pp. 111-118, Feb. 2010.

GitHub, "tcrosen / twitter-bootstrap-typeahead", https://github.com/tcrosen/twitter-bootstrap-typeahead, © 2014 GitHub, Inc., Jan. 23, 2014.

\* cited by examiner

SYNCHRONIZING DATA-SETS

BACKGROUND

The present invention relates to synchronizing data-sets across multiple devices or clients and more specifically to setting type-ahead data using attributes of the user or the environment and synchronizing the type-ahead data between users and/or a centralized register.

Find As-You-Type (formerly called Type-Ahead Find) is a feature that allows quick navigation to or selection of an entry without the need for a user to completely enter the entry. Find as you type may be used when a user types a succession of characters in the body of a displayed field. A common example is client email applications, where the client email application may rely on previously entered email addresses to support type-ahead find prompting. For example, if a user emails billy.blogs@gmail.com today and then should decide to email him again tomorrow, the type-ahead feature would recognize a pattern associated with "Bill . . . " as the user typed the name in the user's email client. The type-ahead feature would recognize the pattern and provide the full email address as a type-ahead prompt. In other words, the type-ahead feature would find the email address billy.blogs@gmail.com before the user finished typing the email address and prompt the user with the complete email address or several other options before the user had typed in all of the characters of the email address.

SUMMARY

Synchronizing data-sets across different users in real-time is provided in systems, methods, computer readable storage media, and other embodiments. The different data-sets to be synchronized across users can be identified by social networks the user is participating in, by identified interests of the user, by the physical location of the device being synchronized, by one or more applications being used on the device, by the season, by a social event being attended by a user, by the identity of a user, and by a wireless network being accessed at that time. Other synchronization tests and matching criteria may also be applied.

In embodiments, the synchronization of data-sets may be for purposes of a user to configure one or more devices or clients with browser recency state or other classes of reused data across clients, applications, machines and devices. In so doing, efforts on one device may be less likely to be or need to be re-produced on other devices. In embodiments, the synchronization of data-sets may be triggered on some knowledge of the user, for example a login identity may be used.

Embodiments may provide where a data-set for completing type-ahead prompts is maintained, assembled, or distributed using attributes that can include the application being used at the user, the location of the user's device, a social attribute of the user, a business attribute of the user, and environmental attributes at a user's device or the type-ahead registry or both. These type-ahead data-sets may also be shared or synchronized between users without the intervention of the type-ahead registry. In these instances, a first user may synchronize its type-ahead data-set with other users sharing the same wireless network or the same wired network or attending the same conference or identifying a mutual interest in the same topic of information (e.g., trees, VoIP telephony, heart surgery, photography, etc.). When data-sets are synched using a registry of and between users, the synching may be done in real-time. Thus, a patron attending an automobile show may receive a data-set that prompts the names of the specific automobile models being displayed at the show when the user keys in a few letters of one or more model names into an Internet search engine. Likewise, customers of a company may receive type-ahead data-sets that provide type-ahead prompts that include the product line of the company.

DETAILED DESCRIPTION

Figure 1:
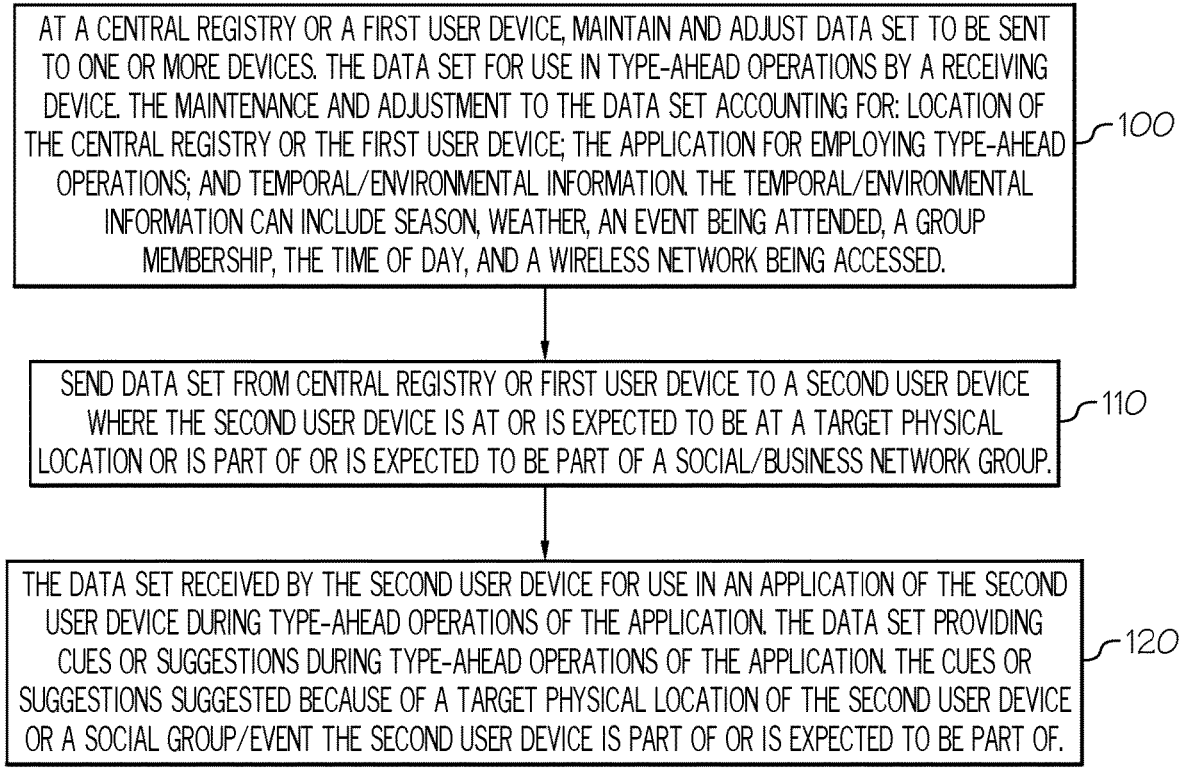
FIG. 1 is a flowchart describing data-set management in accord with embodiments.

Systems, methods, and apparatus, including computer readable storage media, may be employed in embodiments. Embodiments may include grouping users or devices into one or more categories and sharing or synchronizing data-sets or data-set settings of both with users and devices in a shared category. In embodiments, the shared data-set may reflect the data corresponding to individual searches or completed fields or other data from a single user and this data-set from this single user may then be shared to other users, including users who fall within a certain category. In so doing, data-sets for a single user can be leveraged for use to all or some of the users in the same category. Thus, the efforts of a few can be shared with others.

In embodiments, type-ahead data-sets or type-ahead settings (cumulatively type-ahead operations) can be shared and exploited in real-time. When used in situational applications these shared type-ahead operations can enhance productivity in the particular situation such that users can have type-ahead operations specifically targeted for the location of the device and the application being used. For example any user that is in an IBM building may receive type-ahead operations based on their location and these type-ahead operations can be specific to the location of the user. Further synchronization may also occur, where the type-ahead operational data may be updated by operations of a single user and this revised type-ahead data may then be synchronized to all others in the same location or on the same operating system or by having some other shared characteristic.

Adjustment to the shared type-ahead settings may also be carried out based on known distinctions between locations or other recipient characteristics. For example, searches in the U.S. on an iOS™ device (or other device with a mobile operating system) for "fender" may add a prompt of "mudguard" for an iOS™ user known to be in the U.K.

In embodiments predetermined sets of type-ahead operations may also be available based on location and application used as well as possibly being related to the context of the task being executed. The type-ahead operations can also leverage network resources, which may result in type-ahead data being stored for or associated with season, weather and events where the person is attending or the person's acknowledged social network is attending. Accordingly, embodiments have the ability to impose differences and symmetry across numerous devices and users.

In embodiments a user may be able to wrap/configure a shared type-ahead operation around his or her preferred devices and clients, and within a defined characteristic or category to share information such as type-ahead find prompts, browser recency state, and all classes of reused data across clients, applications, machines for other users sharing the characteristic or category. In embodiments this sharing between users may be accomplished in real-time. Storage of the shared type-ahead operations, characteristics, and categories may be employed in embodiments such that settings may be reproduced and synchronized from previous settings when new devices or applications are added or when lost devices or applications need to be replicated.

In embodiments a central registry may be maintained on a server to which all devices for that user and shared users in the shared category of environment may reconcile device level context. Preferences on each device may allow for pulling recent user state tables from this central registry on boot up or application launch or on request or via push. In some embodiments, there may be no central user shared registry maintained such that when state changes within any synchronized device in a given realm changes, the change is immediately pushed to other devices to consume, and the act of consumption can be immediate (if devices are online/available) or pending (available when device is recognized as being available) accept and apply the change in effective real-time.

In embodiments users may quickly add and remove a device or application into and out of the shared environment or category. One such example may be to cater for the temporary use case where the user may be on a machine in an internet cafe and may wish to remove the environment data from this machine when finished, or if the user is on a temporary VM, or if the user is using/borrowing a device temporarily.

Embodiments can include having type-ahead operations comprise email addresses and URLs as well as various other datum, including, recently dialed phone numbers, preferred contacts, browser history, cookies, and useful cache state. Likewise, embodiments can be employed such that in social environments a plurality of users can occupy a shared category, where the data corresponding to one user in that category can be leveraged by other users in that same category or a related category or sub-category. Thus, efforts of a few, in things like name type-ahead, web site type-ahead, etc. can be quickly shared and leveraged by many.

FIG. 1 shows a flowchart of features as may be employed in embodiments. The features in this flowchart and other flowcharts of the application may be employed in various orders and in various ways, with more or less than is described in the flowchart. Box 100 of the flowchart of FIG. 1 identifies a central registry or a first user device and how a data-set for type-ahead operations may be maintained there. This data-set may sent to other devices and may be used by those receiving devices for setup or revision of type-ahead registries maintained at the receiving device. Box 100 also identifies how the type-ahead data-set may track various variables and may be sent to users based on a user's characteristics. These characteristics include an application being run by the user, the location of the user's device, and social groups the user associated with. Box 100 further explains that the type-ahead data-set may be further adjusted to account for temporal or environmental information such as the weather, the time, a wireless network being used, and an event being attended by the recipient.

Box 110 of FIG. 1 explains how type-ahead operations, whether data or settings, may be sent from a registry or first device to a second device that would employ the operations. This second device may be selected for receipt because it is expected to be at a target location (e.g., a business headquarters, a business conference, a restaurant, etc.) or is part of a social or business networking group (e.g., Facebook™, Linkedin™, etc.).

Figure 2:
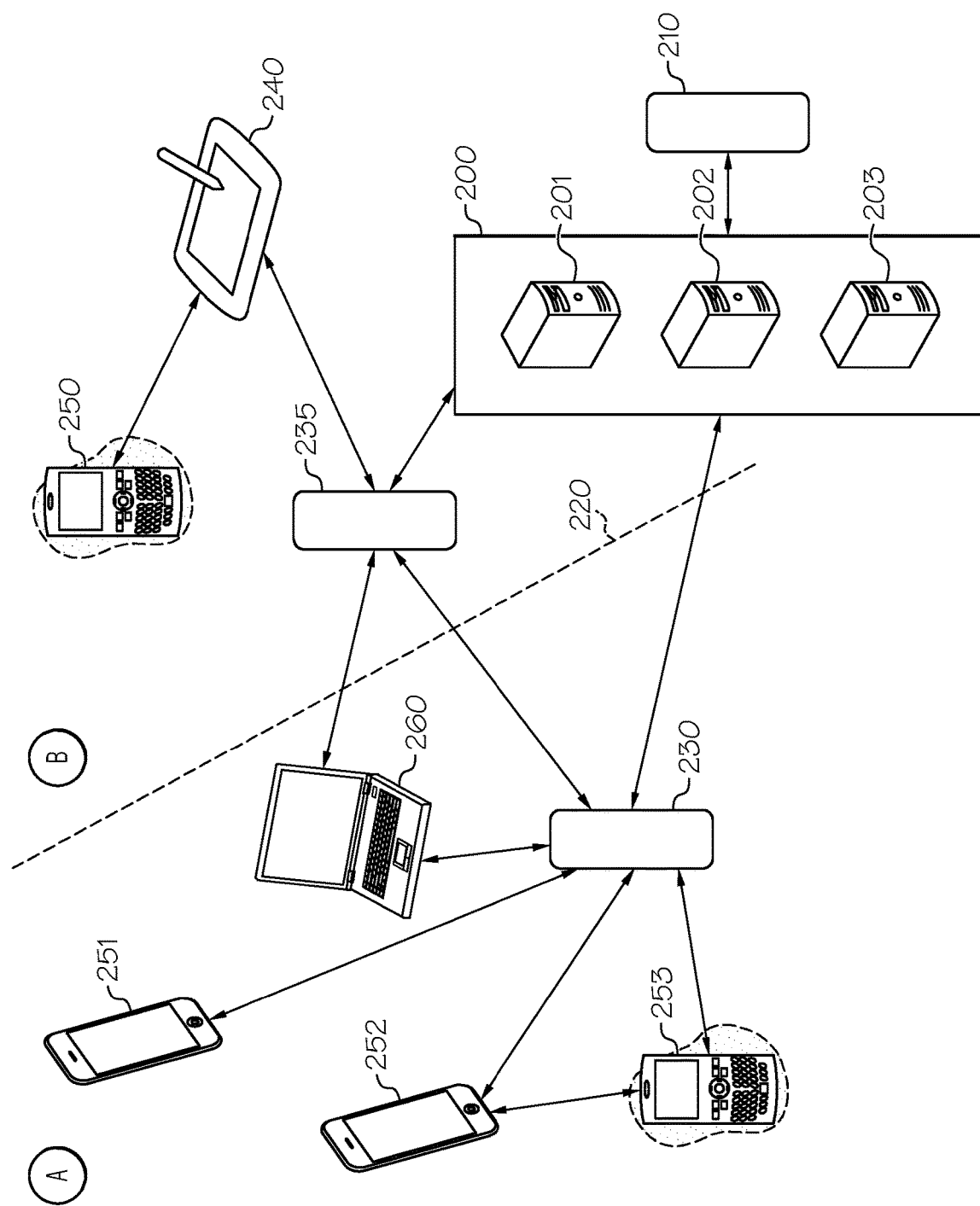
FIG. 2 is a schematic showing components of a system for data-set management as may be employed in embodiments.

Box 120 of FIG. 1 describes how the type-ahead operations, whether data or settings, can be received by the second device and used by the second device during type-ahead operations for one or more applications running or to be run on the second device. A user of the second device may benefit from the additional type-ahead operations received when searches or other uses of one of applicable applications is used. As to the types-ahead data, it may provide cues or suggestions for search terms targeted to the physical location of the second device or a networking group the second device is a member of or expected to become a member of:

FIG. 2 shows a system for synchronizing type-ahead operations in accord with embodiments. Visible in FIG. 2 are user devices 250-253, user device 260, user device 240, computer 200, type-ahead registry 201, communication engine 202, synchronization engine 203, network router 235, network router 210, and network router 230. The user devices 250-253 are shown to be smartphone computers but could be other devices as well. Likewise the user devices 240 and 260 are shown to be a tablet computer and a laptop computer but can be other devices as well. Applications with state on these user devices may include email clients, web browsers, softphones, text messengers, calenders, and translators. other applications with state maintenance may also be available on these user devices. In embodiments, and as discussed above, a single user may be associated with more than one device. For example, user 1 may be the owner of user devices 251 and 240.

The diagonal line 220 is shown to indicate which network the specific device is a member of. As can be seen, devices 251-253 are members of and connected to network 230 while devices 250 and 240 are members of and connected to network router 235. Device 260 is a member of both networks. The network routers 230 and 235 may be wired and wireless routers or other gateway devices to access a network. Each router 230 and 235 is shown in communication with computer 200. This computer 200 is shown to contain type-ahead registry 201, communication engine 202, synchronization engine 203, and is shown to be in communication with network router 210 as well. The computer 200 may maintain a registry 201 that documents the zone a particular device is in, search cues or suggestions that may apply to that particular zone, what the environmental status is for any user of the registry, the statue of any or all users of the registry, and various other information that may be used when tracking or accounting for the type-ahead operations or other data-sets to be shared amongst or synchronized with numerous users. The communication engine 202 may be controlling or carrying out the sending and receiving type-ahead data or settings from users or devices. The synchronization engine 203 may be controlling or carrying out operations needed to track versions, receipt confirmation, login and logout times, etc. with regard to maintaining synchronization of type-ahead data or setting or both across multiple devices, multiple, users, and multiple networks.

Figure 3:
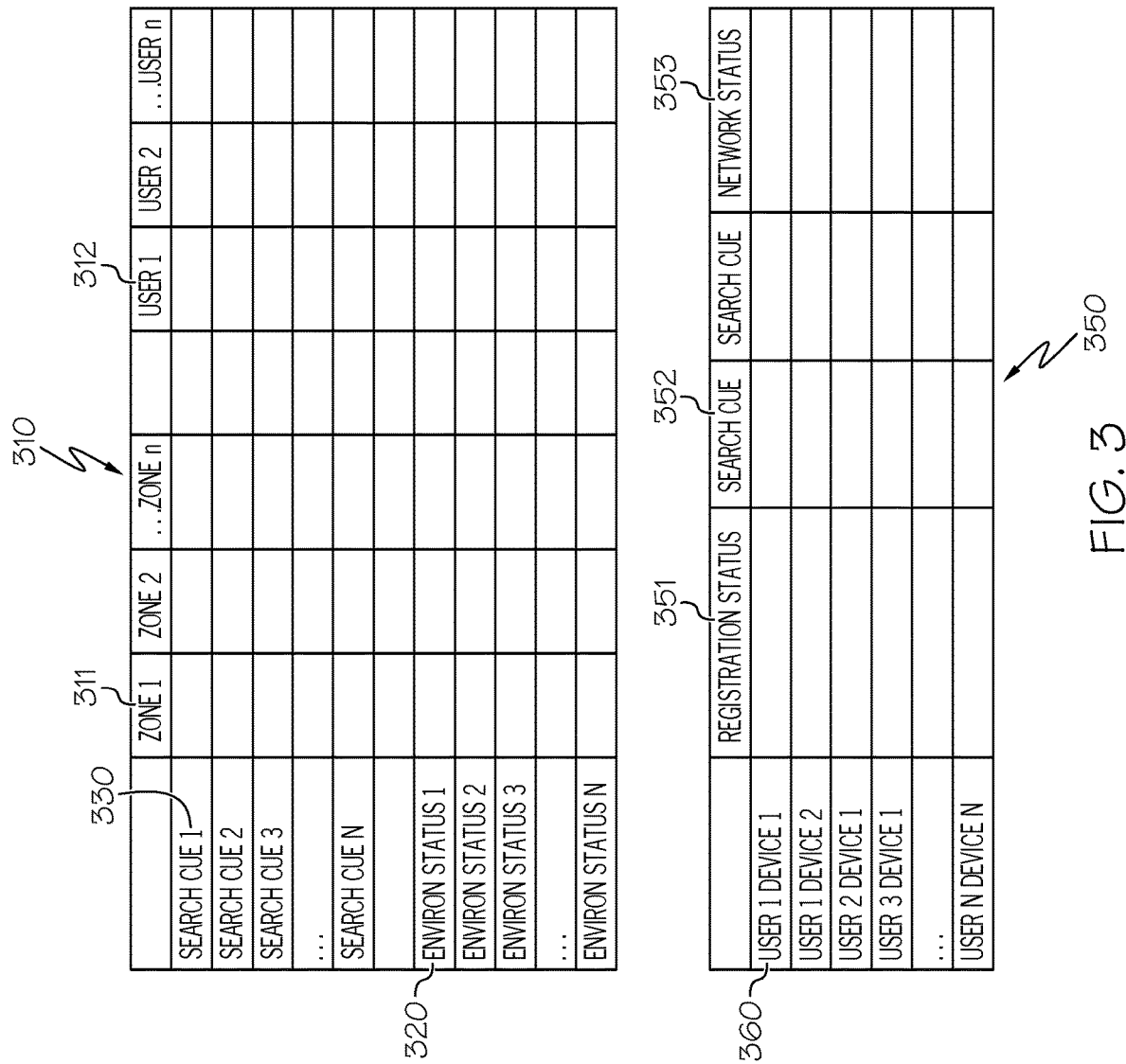
FIG. 3 shows two tables as may be employed at a register for use in embodiments.

FIG. 3 shows two tables that may be present in the registry 210 and that may be maintained by the synchronization engine 212 or other portion of the computer 200. These tables 310 and 350 may be used for maintaining state information for many users 312 and many devices across several networks and for sharing the relevant state information as may be needed for synchronized type-ahead operations. The information tracked in the table may include user searches 330 and 352, environmental status 320, network zones 311, user registration status 351, network status 353, and user devices 360. Other information, including other state information, may also be tracked and managed in these tables.

Figure 4:
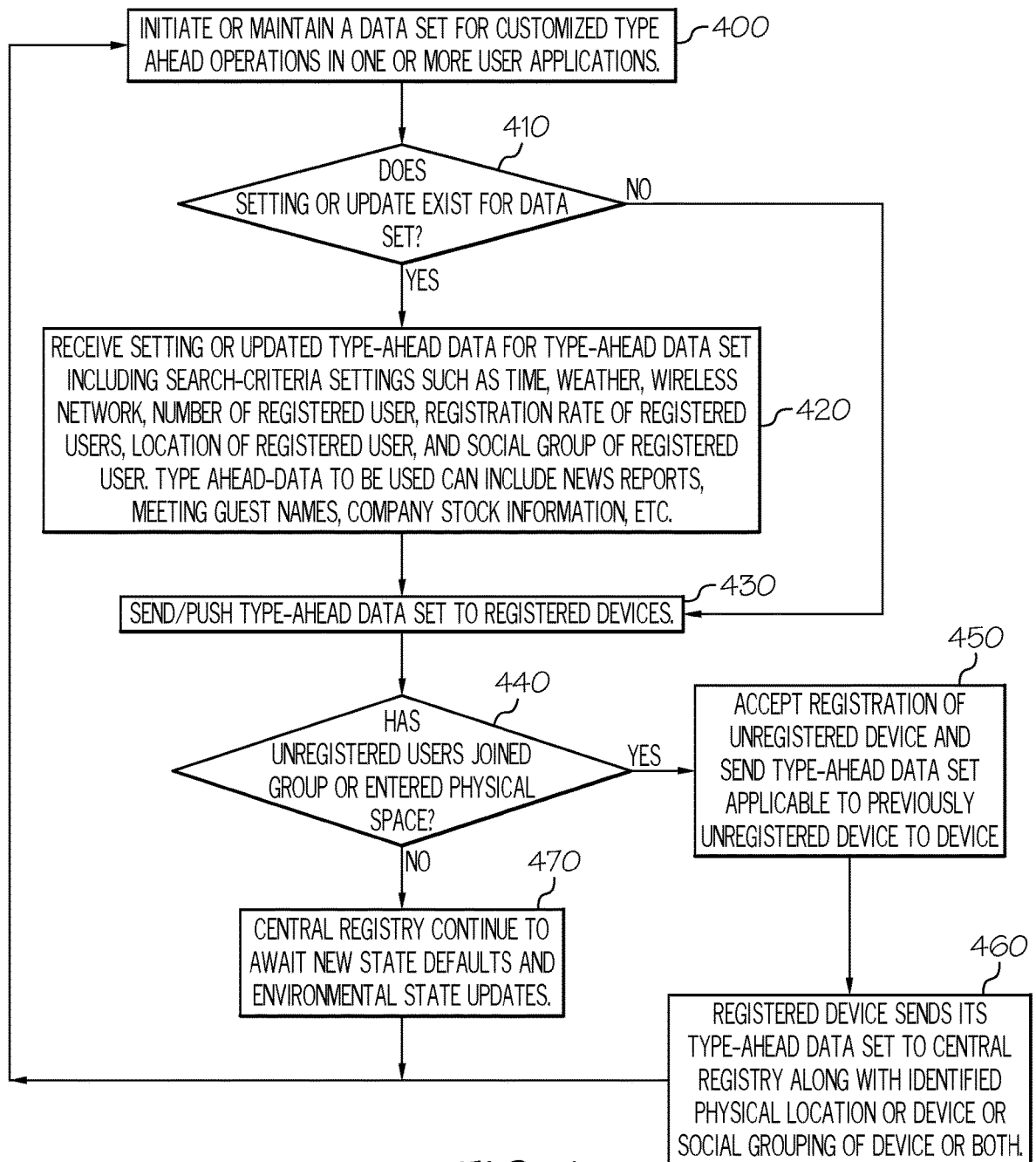
FIG. 4 shows a flowchart describing features of operations as may be stored or otherwise employed in embodiments.

FIG. 4 shows a flowchart of features of processes as may be employed in embodiments. Box 400 of FIG. 4 describes how processes in embodiments may include initiating or maintaining a data-set for customized type-ahead operations for use by one or more users and one or more devices. As the process is employed, periodic queries or updates may be conducted. Decision diamond 410 shows that a determination of whether a setting or an update exists for a data-set. If an update does exist Box 420 discusses how settings or updated type-ahead data may be collected and if no update exists box 430 shows how a data-set may be pushed to existing registered devices. Decision diamond 40 accounts for the entry of new users or devices and shows a determination may be made as to whether an unregistered user or device has joined the network group or entered a tracked physical space. If neither has occurred, box 470 shows the Registry may continue to wait for new state defaults and environmental updates. If an update has occurred, box 450 shows how registrations may be accepted and the previously unregistered device may receive the type-ahead data-set or settings for use by the now registered device. Box 460 shows how the now registered device may itself send updates to the registry as the newly registered device is used. These updates may include physical location device grouping, social grouping, and other aspects or attributes of the device applications, settings, location, and associations.

Figure 5:
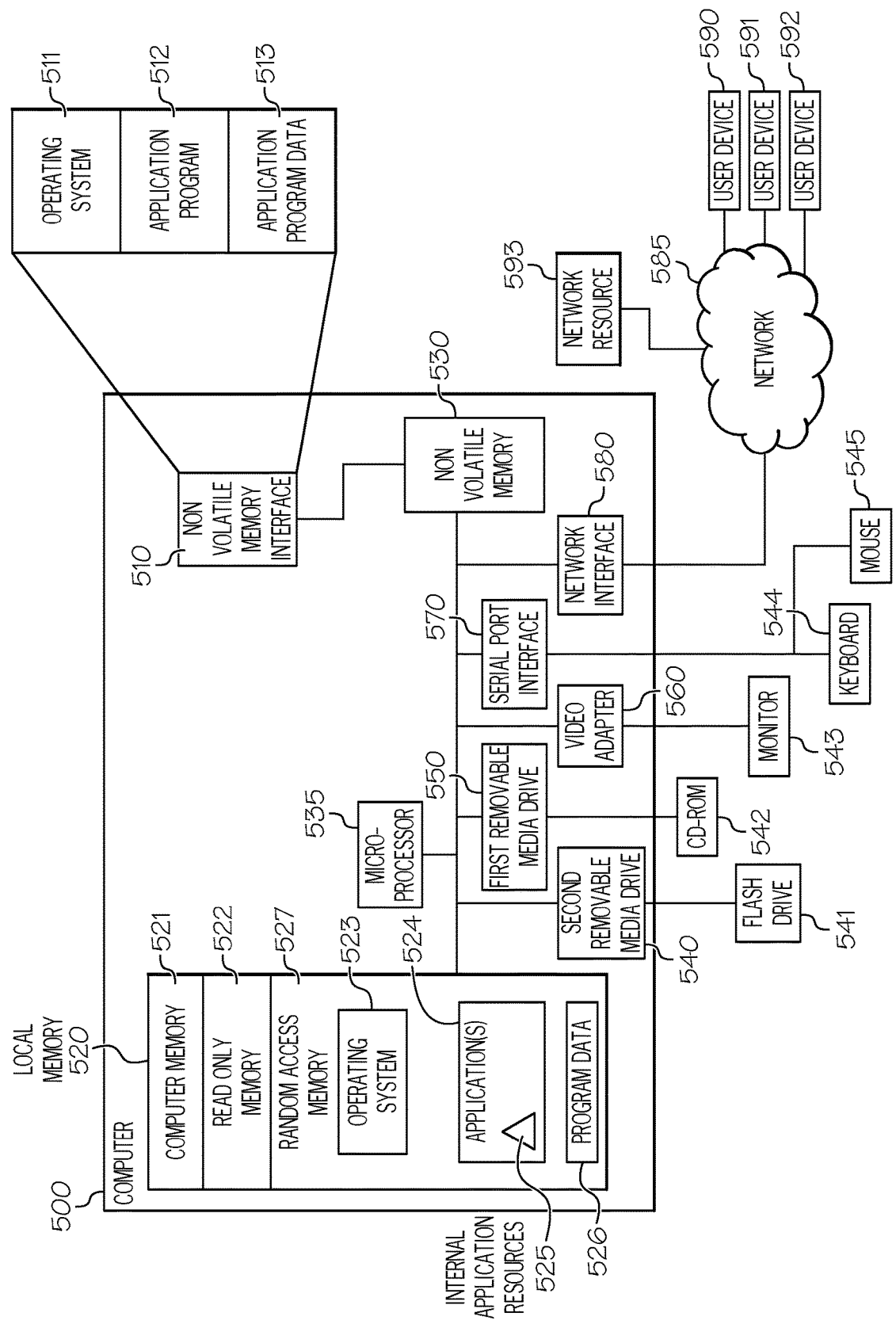
FIG. 5 shows a computing apparatus and network as may be employed in embodiments.

FIG. 5 shows a computer, network, user devices, and network resources as may be employed in embodiments. The computer 500 is shown with a hard drive interface 510, a hard drive 530, a serial port interface 570, a network interface 580, a video adapter 560, a first removable media drive 550, a second removable media drive 540, a processor unit 535, local memory 520 and a bus providing for communication among and between these computer components. The hard drive interface is shown having stored thereon an operating system 511, one or more application program modules 512, and application program data 513. The local memory 520 is shown with system memory 521, Read Only Memory 522, Random Access Memory 527, one or more instances of an operating system 523, one or more applications 524, internal resources for the applications 525, and program data 526. The computer 500 is shown connected to a monitor 543, a keyboard 544, a mouse 545 and network 585. Other input devices, which are not illustrated, may include a microphone, joystick, game pad, satellite dish, scanner, or the like. Flash drive 541 and CD-ROM 542 are shown for connection with removable media drives 540 and 550. The network 585 has network resource 593 and three user devices 590, 591, and 592 in communication with and through the network.

Embodiments may also be considered to be monitoring and synchronizing state across numerous devices. In so doing, embodiments may be considered to recognize that state on one device represents context that can/should be used on a different device that is owned by the same user (or any social cohort). Examples of such state can include browser history, cookies, session information, preferences, passwords, type-ahead cues and subscriptions, etc. A very simply example of synchronized state can include a user entering a URI on a phone that the user does not want to re-enter on his or her iPad™. In this or other embodiments, the categorization or environment may be defined relative to the user's identity, hinged off of a preference on the device, perhaps a selected "manage state across devices." Applications that maintain state/history/context may be modified to save and perhaps place this state into a registry for one device or all devices sharing the service. When a new device is used the registry may push state data-sets to the recently launched device. And, in embodiments, if devices are used concurrently then state may be synchronized in real-time. Moreover, in embodiments, the devices may be transitory, which may account for when a user a peer's device is borrowed (or a user is in an interne café, for example) such that state data-sets may be pushed for the duration of use, updates saved during use, but destroyed after usage (hinged on the user logging out).

In embodiments, operations to be shared can be hinged off of an identity with behaviors as described above. Likewise, the notion of state being shared as described above in a social cohort may also be employed in embodiments. Examples of shared social networks include a family, a team of people, and a group of colleagues. As can be seen, in this example, the social network essentially live in the same realm, where state is managed and maintained in this realm. Implementation of this realm operation may include exploiting a tag (e.g. Smith for the Smith Family) when configured/associated with a device that enters the environment or could benefit from state management across the environment. Other embodiments are also plausible as communities, organizations, and other environments may also be considered and used.

Examples of where type-ahead finds of embodiments may be employed include where an individual user acquires a new client (e.g. iPhone™, iPad™, laptop, desktop, VMWare™ image, alternate browser etc) and the user may have to re-construct the type-ahead and "context" corpus from other devices or earlier sessions, re-establishing patterns in the new client in so doing. Such patterns may include type-ahead on mail names, in browser web sites in the local browser, IP/server addresses, recency lists, and so on. Likewise when someone borrows another's device for a short period of time (e.g. when using a machine at an internet cafe, when using a machine in a lab, when powering up a temporary VM to a particular task), the type-ahead and "context" corpus from other devices or earlier sessions may be established temporarily or permanently on the borrowed device from another user.

Various fields or other areas may be populated in type-ahead embodiments. These include browser history, cookies, recently dialed phone numbers, recently dialed facsimile number, recency state, password credentials, ring tones, background screenshots, ring volume, user interface preferences, application preferences, user interface settings, etc.

In embodiments, replication or synchronization may not be prioritized per say. Rather, embodiments may employ an association of a device or plurality of devices to a user environment, the identification of user-defined application wide states to store in this environment, and the exploitation of this data in real time situational applications where the data in this environment can enhance productivity in the situations described. Implementation of embodiments may include registering an association between clients/devices on a server machine. On that server machine ajazian style pull/push requests can be sent/received either a) on initialization of the client application; b) on request (e.g. a user in an internet cafe associated their client with this server for a temporary (e.g. 60 min) basis and after 60 mins the server takes steps to assist in acquiescing the data on the client; and/or c) on a scheduled basis to keep the user preferred clients/devices up to date.

Still further, embodiments may also include type-ahead operations being by a server or pulled by the user to the device/client. And, the data-sets may be shared with a plurality of individuals corresponding to a social community, directed acyclic graph (e.g. corporate directory), a team/department, or identified third party. Moreover, in embodiments, the type-ahead operations including data-sets and settings, can persist indefinitely at a registry or user, or be updated indefinitely at a registry or user, or for a short window of time.

As a specific example, and further to what is discussed above, the type-ahead data-set may be associated with the location of the device. For example any user determined to be in an IBM building may receive a pre-determined set of type-ahead data based on their location and the applications being used. Here or elsewhere, a type-ahead feature can incorporate technical terms, acronyms or various external dictionaries related to the current communication or location. Moreover, type-ahead data can be associated with season, weather and indeed events where the person is attending. Embodiments can also impose deference or symmetry in various ways for the device such that other devices in the user's realm benefit from consistency in areas like screen background, ring tone, ring volume or other device characteristic (e.g. password), etc The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, material, acts, and equivalents of all means or steps plus function elements in the claims below are intended to include any structure, material or act for performing the function in combination with other claimed elements are specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for providing type-ahead cues, the system comprising:
   a plurality of synchronized user devices each device configured to receive and process type-ahead operations, the type-ahead operations including a data-set of contemporaneous cues or suggestions that comprising word search terms for a user of a device of the plurality of synchronized user devices, the contemporaneous cues or suggestions of the data set used to provide prompts to the user when filling out a fillable field in an application running on the device of the plurality of synchronized user devices, wherein
   each device of the plurality of synchronized user devices is configured of push updates of the data-set of contemporaneous cues or suggestions to all other devices of the plurality of synchronized user devices when there is a realm change of a pushing device of the plurality of synchronized user devices, the pushed updates configured for immediate consumption by receiving devices of the plurality of synchronized user devices or for pending consumption by nonreceiving devices of the plurality of synchronized user devices, and
   a processor configured to update a registry of one device of the plurality of synchronized user devices to reflect the type-ahead operations received from another device of the plurality of synchronized user devices.

2. The system of claim 1 wherein the type-ahead operations include a type-ahead data-set having a plurality of word search terms.

3. The system of claim 1 wherein the application comprises an email client, a web browser, a soft-phone, a text messenger, a calendar, a voice translator, or a code translator.

4. The system of claim 1 wherein the type-ahead operations involve browser history, or cookies that include a field fillable by a user, or recently dialed phone numbers, or password credentials provided in a user fillable field.

5. A method for providing type-ahead cues, the method comprising:
   at a processor of a first device, receive type-ahead operations from a second device, the second device being operable by a first user, the type-ahead operations including a data-set of contemporaneous cues or suggestions comprising word search terms, for the first user of the second device and the data-set being provided to the second device to complete a first fillable field fillable by the first user of the second device, the first fillable field in a first fillable field application running on the second device;
   at the processor of the first device, update a registry of the first device to reflect the received type-ahead operations from the second device;
   at the processor of the second device, synchronizing type-ahead operations between the second device and a third device; wherein
   the third device is being operated by a second user, the first user is different than the second user,
   the synchronized type-ahead operations are for use by a second fillable field application at the third device during processing type-ahead operations of the second fillable field application at the third device, and
   the synchronized type-ahead operations are used by the third device to provide contemporaneous cues or suggestions to the second user when filling the second fillable field of the second fillable field application of the third device.

6. The method of claim 5 wherein the first fillable field application running on the second device comprises an email client, a web browser, a soft-phone, a text messenger, a calendar, a voice translator, and a code translator.

7. The method of claim 5 further comprising:
at the processor of the first device, receive one or more settings for use in type-ahead operations when offering a cue or suggestion for a user entering data into an application on the second device;
wherein the one or more settings for use to complete a field in an application on the second device comprises: a temperature, or time, or user preference, or cookie, or recency state of a user different than the first user.

8. The method of claim 5 further comprising:
at the processor of the first device, remove type-ahead operations, previously sent to the second device for use by a fillable field application on the second device, from the second device when the first user's session in the application on the second device ends.

9. The method of claim 5 further comprising:
updating a registry to reflect updated information of one of the first user or the second device when personal information of the first user changes.

10. A method for providing type-ahead cues, the method including a computer network system having program instructions embodied therewith, the program instructions readable by one or more processors to cause the network system to:
receive type-ahead operations from a first user device of a first user, the type-ahead operations including a data-set of cues or suggestions comprising word search terms, the data-set is used to contemporaneously complete a field fillable by a user, the field in an application running on a user device and including one or more settings for use in type-ahead operations when offering a cue or suggestion for a user entering data into an application on the user's device;
update a registry of the first user device to reflect the received type-ahead operations from the first user device, wherein the first user device is configured to push type-ahead operations when the registry is updated; and
synchronize type-ahead operations from the first user device to a second user device when the second user device is at a target location or is part of a target business networking group or is part of a target social networking group.

11. The method of claim 10 wherein the application running on the first user device with fields fillable by a user comprises an email client, a web browser, a soft-phone, a text messenger, a calendar, a voice translator, a code translator.

12. The method of claim 10 wherein the one or more settings for use to complete a field in an application on the first user device fillable by the first user comprises applications regarding: a temperature, or time, or user preference, or cookie with a field fillable by the first user, or recency state of another user with a field fillable by the another user.

13. The method of claim 10 wherein the program instructions readable by a processor further cause the network system to: update the registry to reflect updated information of one or more users when personal information of the one or more user's changes.

* * * * *